May 16, 1939. T. E. LLOYD 2,158,513
APPARATUS FOR MAKING NODULES OR PELLETS
Filed Sept. 3, 1938
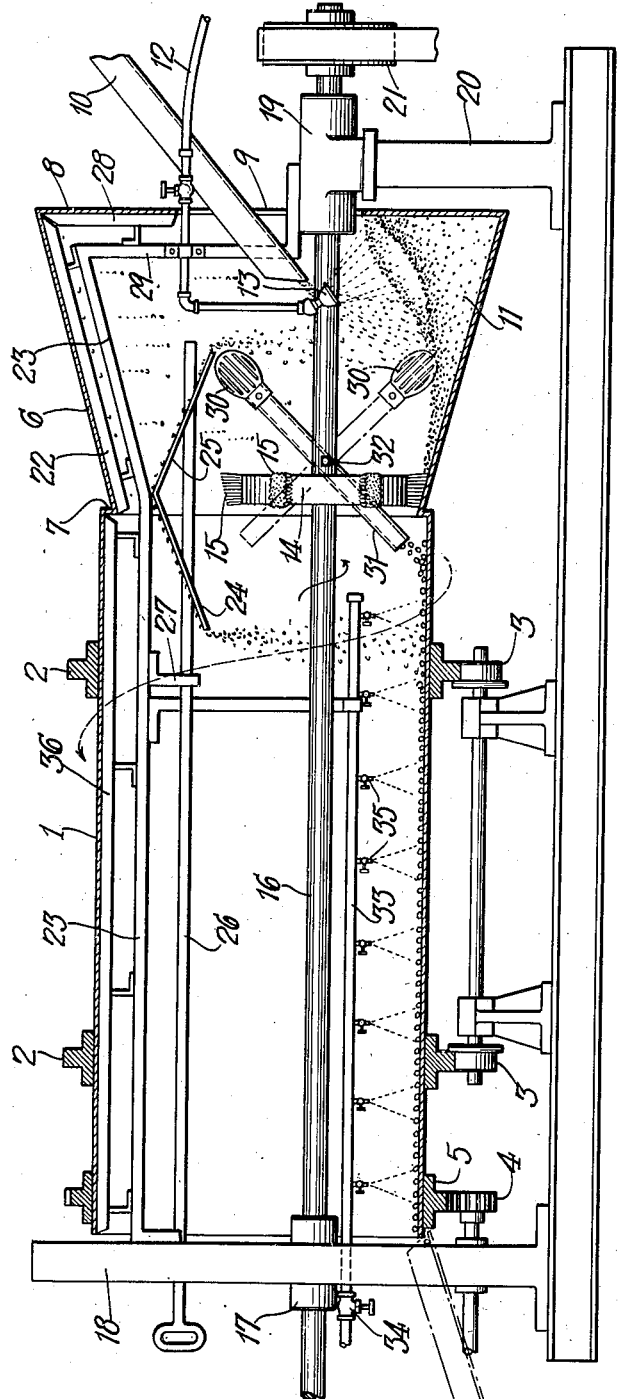
INVENTOR.
*Thorne E. Lloyd.*
BY
*Benj. T. Ruber* ATTORNEY.

Patented May 16, 1939

2,158,513

UNITED STATES PATENT OFFICE 2,158,513

APPARATUS FOR MAKING NODULES OR PELLETS

Thorne E. Lloyd, Netcong, N. J., assignor to Dwight & Lloyd Sintering Company, Inc., New York, N. Y., a corporation of Delaware Application September 3, 1938, Serial No. 228,284

16 Claims. (Cl. 259—3)

My invention relates to apparatus for making pellets or nodules such, for example, as pellets of ore concentrates or ores, cement mixes, calcareous marls and other materials of similar nature for treatment in furnaces such as sintering machines.

In order to produce nodules or pellets having the proper physical characteristics required to hold their shape during metallurgical treatment as, for example, on a sintering bed until they have become sintered, it is necessary that the raw materials, such as the finely ground concentrates, have just the right moisture content, that is, that they are neither too wet nor too dry, that the moisture content be uniformly distributed and that thereupon the material be broken up into aggregates of suitable size and compacted into pellets or nodules.

My present invention provides an apparatus whereby very finely divided particles, such as material finer than 100 mesh, may be moistened uniformly and formed into nodules or pellets of uniform and easily controlled size. Pellets may be formed by the apparatus of my invention with each nodule or pellet having a uniform moisture content throughout, and may be formed with a smooth or troweled surface.

In my invention the finely divided material to be pelletized or nodulized is introduced into a rotating mixing element of inclined or conical shape and rotating on its horizontal axis so as to form an accumulation at the lower larger end of the rotating chamber. A very fine spray of water is played on to this accumulation of finely divided material so as to wet the surface and as it rotates cause the moistened particles of material to roll up into small balls moving toward the smaller end of the chamber where they are crushed by brushes which distribute the moisture throughout the structure then scraped and returned back to the mass being moistened. In this way the accumulation of finely divided or powdered material is gradually moistened without becoming too wet. The moistened material is then supplied to a finishing rotating cylinder chamber in which it divides into small pellets of uniform or controlled size. As the cylinder rotates on a horizontal axis the pellets are caused to roll over and over giving them a uniform rounded shape and also imparting a "troweled" surface. A water spray may be played upon the pellets during this finishing operation if desired.

The various features of the invention are illustrated in the accompanying drawing which shows a vertical section of a pelletizer embodying a preferred form of the invention.

In the accompanying drawing, the embodiment of the invention is illustrated as comprising a horizontal cylinder 1 provided with circular tracks 2 encircling its outer surface and running on trunnions 3 of any suitable arrangement and construction, this manner of supporting a rotating cylinder being well known in the art. The rotation of the cylinder or drum may be accomplished in any suitable manner, as for instance, by a driving pinion or gear 4 meshing with a larger gear 5 on the cylinder or drum. Extending from one end of the cylinder as, for example, from the right-hand end as shown in the drawing, is a mixing chamber 6 of frustoconical shape or curvature with its smaller end adjoining the open end of the cylinder 1 and flaring from this end. The diameter of the conical mixing chamber 6, where it joins the cylinder 1, may be somewhat less than the diameter of the cylinder as shown at 7 in the drawing. The opposite or free end of the conical mixing chamber is provided with an inwardly extending flange or wall 8 leaving a central inlet opening 9 through which a feed chute 10 projects. The finely divided material to be pelletized is fed through the chute 10 and accumulates as at 11 in the lower larger end of the mixing chamber 6.

At the start of the apparatus sufficient material is supplied to bring it to about the level shown in the drawing. The apparatus is then set in rotation. For example, it may rotate counter-clockwise when faced from the right-hand end. The charge tending to collect at the lowest part of the mixing chamber is raised to a peak by the rotation and then tumbles over and down to the bottom again. The water supplied through a pipe 12 is sprayed through a nozzle 13 as a very fine thin spray and in a direction to strike the tumbling pile of the charge just below its peak. Irregular pellets are thus formed, the inside of which is very moist, while the outside is but slightly damp. The larger ones roll forward toward the center of the mixing chamber and out from under the spray, while the finer ones, and as yet unmoistened charge, remain toward the back where they may be acted upon by the spray. A small flow is then started through the charge chute 10. More irregular pellets form and roll forward to the small end of the mixing chamber. As they approach this end of the mixing chamber they come below a rotating wheel 14 provided at its periphery with spaced brushes 15 of stiff material, such as rubber or metal wire, rotating against the inner surface of the mixing chamber at the lowermost part so as to crush the pellets against the surface of the chamber. In this way the very moist inside part of the pellets is thoroughly rubbed into the slightly damp outer surface.

The wheel 14 is rotatably mounted on a rotating shaft 16 supported at the left end of the cylinder 1 in a bearing 17 carried in an upright support 18 and supported at the opposite end of the apparatus in a bearing 19 on a standard 20 and carrying a driving pulley 21 on the part projecting from the bearing 19. The shaft 16 is thus driven independently of the cylinder 1 and the wheel 14 and brushes 15 which rotate in opposite direction from the mixing chamber 6.

The moistened material that is brushed and spread on the inner surface of the drum 6 by the brushes 15 is carried by the rotation of the drum upwardly into contact with a scraper 22 supported on a rod or bar 23 which extends through the upper part of the tube 1 and mixing chamber 6 and is supported at one end on the standard 18, and at the other end on the bearing 19.

As the material carried upwardly on the inner surface of the mixing chamber comes into contact with the scraper 22 it is scraped free and falls off in very loose uniformly damp flakes on to a deflector having two oppositely inclined deflecting surfaces 24 and 25 mounted on a rod 26 slidably supported in a bracket 27 depending from the bar 23. The loosened or falling flakes dropping on to the deflecting surface 25 slide back toward the entrance end of the chamber and drop into the accumulation 11 to be again mixed with the mass therein. Any material collected on the end wall 8 is similarly scraped free by a vertical scraper 28 mounted on a vertical part 29 of the supporting bar 23.

This process of flattening the agglomerations under the brushes 15, scraping them into loose uniformly moistened flakes and returning them to the main part of the charge continues for a time until the charge has become quite uniform, as far as moisture is concerned. As the pile of material grows higher a uniform mass of nodules is formed and moves forwardly over the mass to the smaller end of the chamber. As they move in this direction they are picked up by a dipper 30, fixed to the end of a chute 31, which is adjustably mounted by means of a bolt 32 on to the rotating shaft 16 so that the position of the dipper may be adjusted. Adjustment is made possible by a slot in the chute through which the shank of the bolt 32 passes so that the length of the chute from the point of attachment may be adjusted as well as its angularity. The opposite end of the chute 31 extends to the inlet end of the cylinder 1.

As the shaft 16 rotates the dipper 30 successively picks up a group of the pellets or nodules and then as it rotates from its lowermost position to its uppermost position, as shown in full lines in the drawing, the nodules flow down through the chute into the cylinder 1. When nodulizing certain materials a plate with long narrow openings in it forming a screen or grizzly is bolted in the throat of the scoop or dipper.

After the apparatus has been in operation for a time sufficient to form the pellets in the dipper or scoop 30, the larger irregular pellets will continue to pass downwardly to and under the smoothing brushes 15, while the smaller more regular pellets will accumulate above the coarser ones in position to be taken up by the dipper 30 and transferred by the chute 31 to the cylinder 1. The material of the larger pellets after being smoothed under the brushes 15 will be returned to the mass being mixed but with the moisture content rendered uniform throughout. The uniformity of the nodules or pellets as they come from the dipper into the cylinder 1 is generally sufficient and the cylinder 1 may be shortened or dispensed with entirely in such cases. In other situations greater uniformity is desirable. This is attained by the rolling of the nodules or pellets in the cylinder. As they roll over many times in their travel to the discharge end of the cylinder they become more nearly round and their surface is affected in much the same manner that rough wet cement is when troweled. In the cylinder 1 there is a spray nozzle pipe 33 having a control valve 34 through which the water can be very closely controlled and the number of spray nozzles 35 through which a fine spray of water may be applied to the cylinder. Also a scraper 36 is mounted on the support 23 to scrape the inner surface of the cylinder free from adhering particles.

If greater variation in size of the pellets or nodules is permissible, the output of the apparatus may be increased by increasing the feed and dipping the nodules from the mixing chamber into the cylinder in a less perfect state of nodulization to be finished in the cylinder before they are discharged. The output can still further be increased if the uniformity of size of the nodule is not too exacting by moving the deflector plates 24 and 25 sufficiently toward the inlet end of the mixing chamber to deflect all scrapings directly into the cylinder 1 where a slight additional dampening is sometimes advisable. When this is done the dipper 30 is moved out of operating or acting position.

For mixing of materials when the product desired is to be more nearly like that produced by a pug mill, great uniformity may be obtained by affixing paddles to the shafts in the cylinder. Under these circumstances some moistening would be done in the cylinder and the deflector would be shoved back far enough to deflect all scrapings directly into the cylinder and the supply of water for moisture would be quite heavy.

Various modifications may be made by those skilled in the art without departing from the invention as defined in the following claims.

What I claim is:

1. A pelletizer comprising a mixing chamber having a wall of conic curvature and rotatable with its axis substantially horizontal, means for supplying solids and water in finely divided condition in said mixing chamber near its larger end and means at the smaller end of said chamber to crush agglomerates of moistened material against the inner surface of said chamber and means to return said crushed smooth material to said mixing chamber.

2. A pelletizer comprising a mixing chamber one end of which is smaller than the other and rotatable with its axis horizontal, means for supplying water in a fine spray near the large end, and means at the smaller end of said chamber to crush and smooth the agglomerates of small material against the inner surface of said chamber and means to return such crushed and smooth material to the chamber.

3. A pelletizer comprising a mixing chamber rotatable on an approximately horizontal axis and having its rotating surface sloping upwardly in its lowermost position of rotation, means for supplying solids and water in finely divided condition to said element near its lower end and means at the upper end of said element to crush and smooth the agglomerates of moistened material against the inner surface of said chamber and means to return said crushed materials to said chamber.

4. A pelletizer comprising a mixing chamber having a wall rotating on a substantially horizontal axis and with the inner surface of said wall inclined upwardly in its lowermost position of rotation, means for supplying solids and water in finely divided condition to said chamber near its lower end, a rotating brush at the upper end of said element acting against said rotating surface in its lower position of rotation to crush and smooth the moistened material against the rotating surface of said chamber and a scraper for removing said crushed and smoothed material to permit it to fall back into the interior of said chamber.

5. A pelletizer comprising a mixing chamber having a wall rotating on a substantially horizontal axis and with the inner surface of said wall inclined upwardly in its lowermost position of rotation, means for supplying solids and water in finely divided condition to said chamber near its lower end, a rotating brush at the upper end of said element acting against said rotating surface in its lower position of rotation to crush and smooth the moistened material against the rotating surface of said chamber, a scraper for removing said crushed and smoothed material to permit it to fall back into the interior of said chamber and a dipper comprising a scoop to scoop up material from said chamber in advance of said brush, and an inclined chute extending through the upper end of said chamber and means for rotating said dipper about a substantially horizontal axis with said chute at an angle to its axis of rotation.

6. A pelletizer which comprises a cylinder rotatable with its longitudinal axis horizontal, an extension flaring outwardly from one end of and rotating with said cylinder, means to supply material to be pelletized and water to the flared end of said extension, scrapers to scrape material from the inner surface of said cylinder and extension, a rotatable shaft extending through said cylinder and extension and offset downwardly from the axis thereof, a wheel on said shaft near the smaller end of said extension, crushing elements on said wheel acting against the inner surface of said extension to break up agglomerates of material, a dipper on said shaft comprising a chute secured at an angle to said shaft and a scoop on the end of said chute within the extension, the chute extending from said scoop into said cylinder, a deflector below said scraper and having deflecting parts extending from a ridge, one into said cylinder and the other into said extension, and means to adjust said deflector longitudinally of said cylinder and said extension to bring said ridge to an adjusted position above said wheel.

7. A pelletizer which comprises a cylinder rotatable with its longitudinal axis substantially horizontal, an extension flaring from one end of and rotatable with said cylinder, means to supply material to be pelletized to the flared end of said extension, a water spray in said extension, scrapers to scrape material from the inner surface of said cylinder and extension, a rotatable shaft extending through said cylinder and extension and offset downwardly from the axis thereof, means on said shaft acting against the surface of said extension near its smaller end to crush agglomerates of moistened material on the inner surface of said extension and a deflector above said crushing element and below said scraper to deflect material scraped from the surface of said extension backwardly into said extension or into said cylinder.

8. A pelletizer which comprises a cylinder rotatable with its longitudinal axis horizontal, an extension flaring outwardly from one end of and rotating with said cylinder, means to supply material to be pelletized and water to the flared end of said extension, scrapers to scrape material from the inner surface of said cylinder and extension, a rotatable shaft extending through said cylinder and extension and offset downwardly from the axis thereof, a wheel on said shaft near the smaller end of said extension, crushing elements on said wheel acting against the inner surface of said extension to break up agglomerates of material, a dipper on said shaft comprising a chute secured at an angle to said shaft and a scoop on the end of said chute within the extension, the chute extending from said scoop into said cylinder, a deflector below said scraper and having deflecting parts extending from a ridge, one into said cylinder and the other into said extension, and means to adjust said deflector longitudinally of said cylinder and said extension to bring said ridge to an adjusted position above said wheel, and means to adjust the angularity and position of said dipper.

9. A pelletizer which comprises a cylinder rotatable with its longitudinal axis horizontal, an extension flaring outwardly from one end of and rotating with said cylinder, means to supply material to be pelletized and water to the flared end of said extension, scrapers to scrape material from the inner surface of said cylinder and extension, a rotatable shaft extending through said cylinder and extension and offset downwardly from the axis thereof, a wheel on said shaft near the smaller end of said extension, crushing elements on said wheel acting against the inner surface of said extension to break up agglomerates of material, a dipper on said shaft comprising a chute secured at an angle to said shaft and a scoop on the end of said chute within the extension, the chute extending from said scoop into said cylinder, a deflector below said scraper and having deflecting parts extending from a ridge, one into said cylinder and the other into said extension, and means to adjust said deflector longitudinally of said cylinder and said extension to bring said ridge to an adjusted position above said wheel, and water sprays in said cylinder.

10. A pelletizer comprising a cylinder rotatable with its longitudinal axis substantially horizontal, an extension flaring from one end of and rotatable with said cylinder and having an end wall with a feed opening centrally therein, means to supply material to be pelletized through said opening, means to spray water on to material in the lower enlarged end of said extension, means to crush moistened agglomerates against the lower inner surface of said extension near its smaller end, means to detach crushed material from the inner surface of said extension and means to return said detached material to the larger end of said extension.

11. A pelletizer comprising a cylinder rotatable with its longitudinal axis substantially horizontal, an extension flaring from one end of and rotatable with said cylinder and having an end wall with a feed opening centrally therein, means to supply material to be pelletized through said opening, means to spray water on to material in the lower enlarged end of said extension, means to crush moistened agglomerates against the lower inner surface of said extension near its smaller end, means to detach crushed material from the inner surface of said extension and means to return said detached material to the larger end of said extension, and means to pick up surface material intermediate said supply and said crushing elements and to feed it through the smaller end of said extension.

12. A pelletizer comprising a forming chamber rotatable on a substantially horizontal axis, a rotating moistening chamber delivering to said forming chamber, means to supply water and material to be pelletized to said moistening chamber, means at the delivery end of said moistening chamber to crush moistened aggregates and return them toward the inlet part of said moistening chamber, and means to transfer moistened aggregates from said moistening chamber to said forming chamber past said crushing means.

13. The apparatus of claim 12 in which said transfer means comprises a dipper to scoop the upper layers of moistened material over said crusher into said forming chamber.

14. The apparatus of claim 12 in which said crusher comprises rotating means acting against the inner surface of said moistening chamber.

15. A pelletizer comprising a forming chamber rotatable substantially on a horizontal axis, a rotating moistening chamber delivering to said forming chamber, means to supply water and material to be pelletized to said moistening chamber, means at the delivery end of said moistening chamber to crush moistened aggregates, and means to return part of said moistened aggregates to said moistening chamber and to deliver the balance to said forming chamber.

16. A pelletizer comprising a forming chamber rotatable on a substantially horizontal axis, a rotating moistening chamber rotating on an extension of the axis of said forming chamber and of enlarged diameter at its end remote from said moistening chamber, means for supplying water and material to be pelletized to said moistening chamber near its remote end, means at the smaller end of said moistening chamber to crush moistened aggregates and return them toward the larger end of said chamber, and means to transfer moistened aggregates from said moistening chamber to said forming chamber.

THORNE E. LLOYD.